US008571047B2

(12) United States Patent
Zhu

(10) Patent No.: US 8,571,047 B2
(45) Date of Patent: Oct. 29, 2013

(54) METHOD, MEDIA GATEWAY AND SYSTEM FOR MANAGING A FILTER RULE

(75) Inventor: Ning Zhu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 70 days.

(21) Appl. No.: 13/102,779

(22) Filed: May 6, 2011

(65) Prior Publication Data

US 2011/0211586 A1  Sep. 1, 2011

Related U.S. Application Data

(63) Continuation of application No. PCT/CN2009/074538, filed on Oct. 20, 2009.

(30) Foreign Application Priority Data

Nov. 7, 2008  (CN) .......................... 2008 1 0218964

(51) Int. Cl.
*H04L 12/28* (2006.01)
*H04L 12/56* (2011.01)

(52) U.S. Cl.
USPC .......................................... 370/401; 370/392

(58) Field of Classification Search
USPC .......................................... 370/389, 392, 401
See application file for complete search history.

(56) References Cited

U.S. PATENT DOCUMENTS

| 2005/0076108 A1 | 4/2005 | Li et al. |
| 2007/0234414 A1 | 10/2007 | Liu |
| 2008/0212596 A1 | 9/2008 | Lin |
| 2009/0103551 A1 | 4/2009 | Lin |

FOREIGN PATENT DOCUMENTS

| CN | 1870631 A | 11/2006 |
| CN | 1905555 A | 1/2007 |
| CN | 101005496 A | 7/2007 |
| CN | 101160774 A | 4/2008 |
| CN | 1905555 B | 7/2010 |
| EP | 1947816 A1 | 7/2008 |
| WO | WO 02/19644 A1 | 3/2002 |
| WO | WO 2008/003262 | * 1/2008 |
| WO | WO 2008/003262 A1 | 1/2008 |

OTHER PUBLICATIONS

Extended European Search Report issued in corresponding European Patent Application No. 09824386.8, mailed Apr. 18, 2012.
Written Opinion of the International Searching Authority issued in corresponding PCT Patent Application No. PCT/CN2009/074538, mailed Feb. 4, 2010.

(Continued)

*Primary Examiner* — Ronald Abelson

(74) *Attorney, Agent, or Firm* — Brinks Hofer Gilson & Lione

(57) ABSTRACT

A method, a Media Gateway (MG), and a system for managing a filter rule are disclosed. The method includes: The MG receives a processing message from a Media Gateway Controller (MGC); and the MG maintains the packet filter rule context according to the processing message, where the packet filter rule context includes at least one filter rule for filtering a packet received or sent by the MG. The processing message may be a message for creating, modifying or deleting the packet filter rule context. With the present disclosure, the MGC can manage the packet filter rule on the MG effectively.

15 Claims, 3 Drawing Sheets

(56) References Cited

OTHER PUBLICATIONS

Office Action issued in corresponding Chinese Patent Application No. 200810218964.8, mailed Feb. 29, 2012.
International Search Report issued in corresponding PCT Patent Application No. PCT/CN2009/074538, mailed Feb. 4, 2010.
ETSI, "Telecommunications and Internet Converged Services and Protocols for Advanced Networking (TISPAN); Gate Control Protocol", ETSI TS 102 333, V1.2.0. Jan. 2008.
Office Action issued in corresponding Chinese Patent Application No. 200810218964.8, mailed Sep. 13, 2012.
Office Action issued in corresponding Chinese Patent Application No. 200810218964.8, mailed Mar. 29, 2013.

* cited by examiner

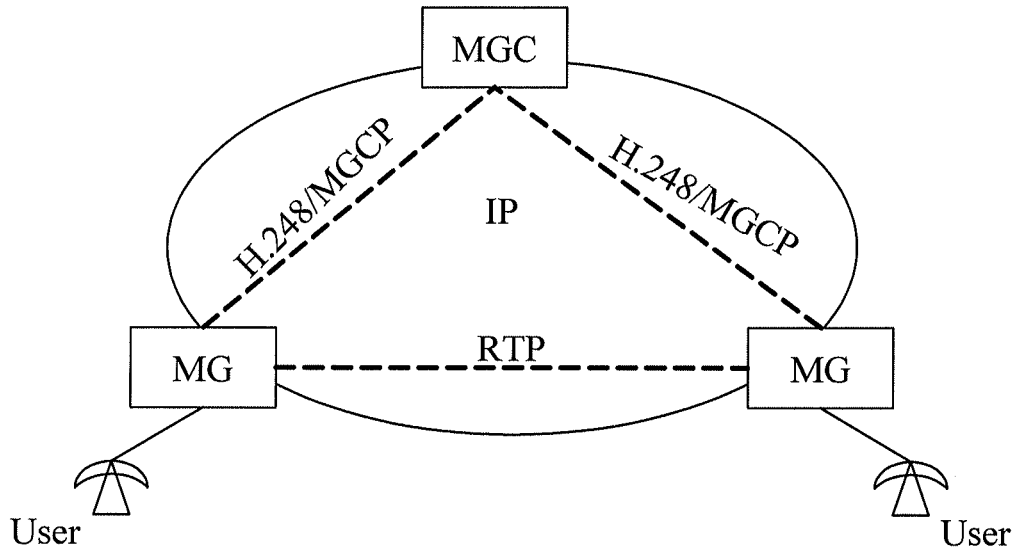
FIG. 1 – PRIOR ART
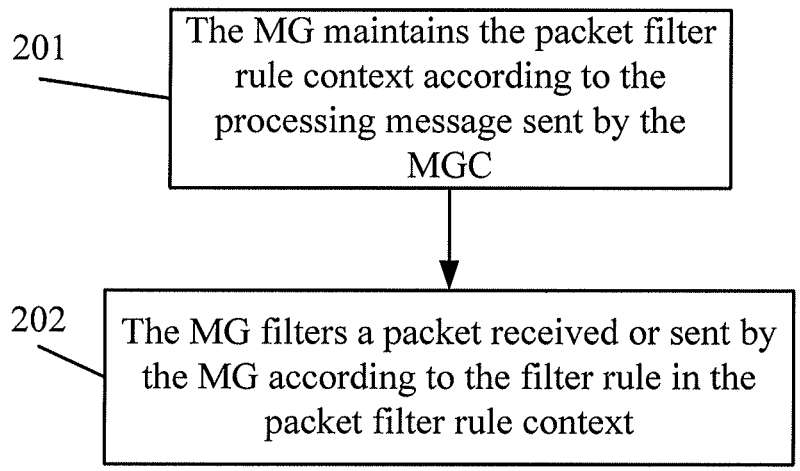
FIG. 2

METHOD, MEDIA GATEWAY AND SYSTEM FOR MANAGING A FILTER RULE

CROSS-REFERENCE TO RELATED APPLICATIONS

This application is a continuation of International Application No. PCT/CN2009/074538, filed on Oct. 20, 2009, which claims priority to Chinese Patent Application No. 200810218964.8, filed on Nov. 7, 2008, both of which are hereby incorporated by reference in their entireties.

FIELD OF THE DISCLOSURE

The present disclosure relates to network communications, and in particular, to a method, a Media Gateway (MG), and a system for managing a filter rule.

BACKGROUND

The Next Generation Network (NGN) adopts a distributed network structure. It bears voice, video and multimedia services effectively, and is implemented such that the service application, service control, and service transmission are separated from each other. An NGN in the prior art includes an MG and a Media Gateway Controller (MGC). The MGC is configured to manage call states and control bearer resources of the MG; and the MG is configured to create, modify, release and manage media streams under control of the MGC.

Generally, the MG works in Back-to-Back (B2B) mode when it serves as a border gateway. That is, a termination is created in either of two Internet Protocol (IP) networks, and is allocated an address of the IP network of the termination. This address acts as a source address for sending media streams and a destination address for receiving the media streams in the respective IP networks of terminations. Generally, each media stream has a definite peer for each termination, and the filter rule is intended only for the address of this peer. Therefore, there is only one filter rule usually.

The MG in the H.248.64 protocol works in routing mode, and uses a termination to represent an interface. That is, a termination corresponds to an interface rather than an address in an IP network. The corresponding filter rule is set on the termination that represents the interface. However, a single filter rule is not enough as a firewall packet filter rule on the interface. There may be tens of thousands of firewall packet filter rules on an interface.

In the prior art, the MGC is unable to control the filter rules on the interfaces of the MG effectively, namely, the MGC is generally unable to perform control operations such as an audit for the filter rules in the properties of the terminations of the MG.

SUMMARY

A method for managing a filter rule includes: receiving, by an MG, a processing message sent by an MGC; and maintaining a packet filter rule context according to the processing message sent by the MGC, where the packet filter rule context includes a filter rule for filtering a packet received or sent by the MG, and the processing message may be a message for creating, modifying or deleting the packet filter rule context.

Another aspect of the present disclosure provides an MG. The MG includes: a context processing unit, configured to maintain a packet filter rule context according to a processing message sent by an MGC, where the packet filter rule context includes a filter rule for filtering a packet received or sent by the MG; and the processing message may be a message for creating, modifying or deleting the packet filter rule context; and a filtering unit, configured to filter the packet received or sent by the MG according to the filter rule in the packet filter rule context.

A network system provided in an embodiment of the present disclosure includes: an MGC, configured to send a processing message to an MG; and the MG, configured to maintain a packet filter rule context according to the processing message sent by the MGC, and filter a packet received or sent by the MG according to filter rule in the packet filter rule context, where the packet filter rule context includes a filter rule for filtering a packet received or sent by the MG, and the processing message may be a message for creating, modifying or deleting the packet filter rule context.

In the technical solution provided herein, the MGC controls the packet filter rule on the interfaces of the MG by processing the packet filter rule contexts in the MG. Because there may be multiple packet filter rule contexts, the MGC may set all filter rules on the interfaces of multiple MGs in separate attempts, and set the contexts through messages transmitted between the MGC and the MG in multiple attempts, thereby managing the packet filter rule on the interfaces of the MG effectively.

BRIEF DESCRIPTION OF THE DRAWINGS

The accompanying drawings provided description of the embodiments of the present disclosure or the prior art. The accompanying drawings outlined below are exemplary only and not exhaustive, and persons of ordinary skill in the art can derive other drawings from such accompanying drawings without any creative effort.

FIG. 1 shows an NGN network structure in the prior art;

FIG. 2 is a flowchart of a method for filtering a packet in an embodiment of the present invention;

DETAILED DESCRIPTION OF THE EMBODIMENTS

Figure 3:
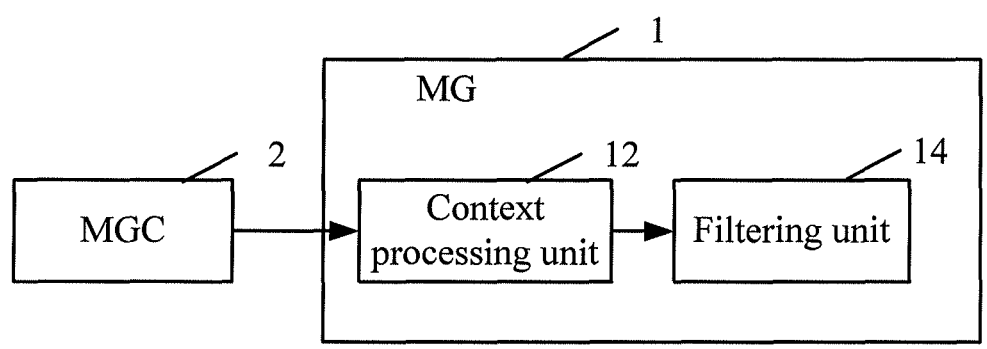
FIG. 3 shows a structure of a network system in an embodiment of the present invention.

The technical solution under the present invention is described below with reference to embodiments and accompanying drawings. The embodiments described below are exemplary only and not exhaustive. All other embodiments, which can be derived by those skilled in the art from the embodiments provided herein without any creative efforts, shall fall within the scope of the present disclosure.

FIG. 1 shows an NGN network structure in the prior art. As shown in FIG. 1, the NGN includes an MGC and an MG. The MGC is configured to manage call states and control bearer resources of the MG; and the MG is configured to create, modify, release and manage media streams under control of the MGC. The MGC interacts with the MG through an H.248 protocol or a Media Gateway Control Protocol (MGCP), and different MGs interact with each other through a Real-Time Transport Protocol (RTP).

In the existing technical conditions, if the packet filter rules on an interface are described through a property defined on a termination in the prior art, the property is very long because there may be tens of thousands of filter rules in the property of a termination. When the MGC needs to create or modify a filter rule on the MG interface, the property of the termination is operated as a whole. Therefore, when the MGC sends a message for modifying a termination property that includes the filter rules, the message is very long, but the maximum length of the message allowed in the H.248 protocol for communications between the MGC and the MG at the transport layer is limited. Therefore, it is almost impossible to control (such as audit) the filter rules in the termination property.

The present disclosure provides the following technical solution to solve the foregoing problems. FIG. 2 is a flowchart of a method for filtering a packet in an embodiment of the present disclosure. As shown in FIG. 2, the method includes the following steps:

201. The MG maintains the packet filter rule context according to the processing message sent by the MGC. The packet filter rule context includes at least one rule for filtering the packet received or sent by the MG. After one or more packet filter rules stored in all packet filter rule contexts on an interface are gathered, a complete list of packet filter rules on the interface is obtained.

The processing message may be a message for creating, modifying or deleting the packet filter rule context. Accordingly, the MG may create a new packet filter rule context, or modify a created packet filter rule context, or delete a created packet filter rule context according to the processing message sent by the MGC, and return a reply message to the MGC after the packet filter rule context is created, modified or deleted.

At the time of creating a packet filter rule context, the content of the packet filter rule context may be null, or the filter rules of the packet filter rule context are set at the same time of creating the packet filter rule context by setting the context property. The modification of a packet filter rule context includes adding, modifying, or deleting the filter rules in the packet filter rule context.

Taking the H.248 protocol as an example, the meanings of the packet filter rule context in the MGC are described below. In the H.248 protocol, various resources on the MG are abstractly expressed as a termination. Terminations are categorized into physical terminations and ephemeral terminations. A physical termination represents a physical entity of semi-permanent existence, for example, Time Division Multiplex (TDM) channels; and an ephemeral termination represents a public resource released after the resource is requested for temporary use and released after the use, for example, RTP streams. A root termination represents the entirety of the MG. Combinations of terminations are abstractly expressed as a context. A context may include multiple terminations. Therefore, relations between terminations are described by a topology. A termination not correlated with any other termination is included in a special context called "null".

Based on such an abstract model of the protocol, a call connection is essentially equivalent to operations for terminations and contexts. Such operations are performed through command requests and replies exchanged between the MGC and the MG. The types of command include: Add, Modify, Subtract, Move, AuditValue, AuditCapabilities, Notify, and ServiceChange. Command parameters, also known as descriptors, are categorized into Property, Signal, Event, Statistic, and so on. The parameters of service dependence are aggregated into a package logically.

Terminations need to be added to a created context of an H.248 protocol message, and a new termination may be added to the context of a subsequent message, or an existing termination may be deleted or moved from the context. If all terminations in a context are deleted or moved, the context is futile and deleted automatically.

A new context, namely, a packet filter rule context, is applied in this embodiment to store filter rules. The packet filter rule context includes one or more of the following properties: "filter rule object", indicating a network domain to which a filter rule is applied, or indicating an interface to which a filter rule is applied; "flag" property, identifying the context as a packet filter rule context; "switch" property, indicating whether a filter rule in the packet filter rule context is valid; and "priority" property, indicating the priority of a filter rule in the packet filter rule context.

The packet filter rule context includes one or more terminations, which is decided by the characteristics of the packet filter rule context. Such terminations are added to ensure existence of the packet filter rule context. Certain information may be stored on such terminations. The information may be a packet filter rule, filter rule object, flag, packet filter rule switch, and priority. The packet filter rule context property may be modified by using commands such as Add, Delete, Modify, and Move. From the perspective of the packet filter rule context, the modification of the packet filter rule context property is equivalent to modification of the packet filter rule context.

202. The MG filters the packet received or sent by the MG according to the filter rules in the packet filter rule context.

The packet filter rule context is further described with an example. The packet filter rule context includes:

(1) A Flag Property, which is Optional

The flag property may be a context property "FilterRule" of the H.248 protocol; its data type is BOOL, and its value may be "Yes" or "No", and is "No" by default. The value "Yes" indicates that the context is a packet filter rule context; and the value "No" indicates that the context is not a packet filter rule context.

The flag property may derive from extension of the existing H.248 property. For example, the IP routing package of the H.248 standard provides a property that describes the context type, for example, B2B type or IP route type or NAT type. A type enumeration value may be added to this property to represent the packet filter rule type.

(2) A Filter Rule Property, which is Mandatory

The filter rule may be the context property "FilterRuleItem" of the H.248 property. This context property is designed to store the packet filter rules. Through setting and modification of this context property value, the MGC or MG may operate and maintain the packet filter rule. The data type of this context property may be a string, and the string stores an item of the packet filter rule table.

The packet filter rule may include one or more of the following rules:

reject the connection from a specific host or network segment;

allow the connection from a specific host or network segment;

reject the connection from a specified port of a specific host or network segment;

allow the connection from a specified port of a specific host or network segment;

reject all connections between a local host/network and another host/network;

allow all connections between a local host/network and another host/network;

reject connections between a local host/network and a specified port of another host/network;

allow connections between a local host/network and a specified port of another host/network;

not use the internal address as a source address for any incoming packet on the Intranet;

use the internal address as a destination address for any incoming packet on the Intranet;

use the internal address as a source address for any outgoing packet on the Intranet;

not use the internal address as a destination address for any outgoing packet on the Intranet; and not use the private address or 127.0.0.0/8 as a source address or destination address for any incoming or outgoing packet on the Intranet. The addresses configured by the Dynamic Host Configuration Protocol (DHCP) automatically and the broadcast address also need to be blocked.

The syntax of the property "FilterRuleItem" is flexible, and may be as follows:

"reIn: 138.76.28.0/24", indicating rejection of a packet from the network segment with the network address "138.76.28.0" and mask "255.255.255.0";

"acIn: 138.76.28.0/24", indicating acceptance of a packet from the network segment with the network address "138.76.28.0" and mask "255.255.255.0";

"reIn: 138.76.28.100:10000", indicating rejection of a packet from the host with the network address "138.76.28.100" and port "10000";

"acIn: 138.76.28.100:10000", indicating acceptance of a packet from the host with the network address "138.76.28.100" and port "10000";

"reOut: 138.76.28.0/24", indicating rejection of a packet sent to the network segment with the network address "138.76.28.0" and mask "255.255.255.0";

"acOut: 138.76.28.0/24", indicating acceptance of a packet sent to the network segment with the network address "138.76.28.0" and mask "255.255.255.0";

"reOut: 138.76.28.100:10000", indicating rejection of a packet sent to the host with the network address "138.76.28.100" and port "10000";

"acOut: 138.76.28.100:10000", indicating acceptance of a packet sent to the host with the network address "138.76.28.100" and port "10000";

"reInaddr", indicating that no incoming packet on the Intranet can use the internal address as a source address;

"acInaddr", indicating that an incoming packet on the Intranet must use the internal address as a destination address;

"acOutaddr", indicating that an outgoing packet on the Intranet must use the internal address as a source address; and "reOutaddr", indicating that no outgoing packet on the Intranet can use the internal address as a destination address.

Nevertheless, the property content may be defined in other ways.

One string of the context property "FilterRuleItem" may store one packet filter rule, or multiple packet filter rules separated by delimiters.

The data type of the context property "FilterRuleItem" may be defined as a string list to store multiple packet filter rules.

At the time of creating a new packet filter rule context, the packet filter rules of the MG may be set as values of the context property "FilterRuleItem".

The stored packet filter rule may be modified by modifying the value of the context property "FilterRuleItem" in the existing packet filter rule context. Such an operation may be understood as modification of the packet filter rule context.

The packet filter rule context may be deleted by deleting all terminations in the existing packet filter rule context, and the packet filter rules carried in the context property "FilterRuleItem" in the packet filter rule context are deleted together, or the value of the context property "FilterRuleItem" is set to null to delete the packet filter rule.

(3) A Packet Filter Rule Switch Property, which is Optional

The packet filter rule switch property may be the context property "FilterRuleSwitch" of the H.248 protocol. This property is used as a switch to indicate whether the packet filter rule stored in the packet filter rule context is in use. The data type of this property value may be a BOOL type. The value "Yes" indicates that the packet filter rule stored in the packet filter rule context is valid and needs to be put into use; and the value "No" indicates that the packet filter rule stored in the packet filter rule context is invalid.

(4) A Priority Property, which is Optional

The priority property may be the context property "FilterRulePrior" in the H.248 protocol. This context property is designed to describe the priority of a packet filter rule, and the packet filter rule of a higher priority is applied with priority. The data type of this property value is an integer. A smaller value of the property value indicates a higher priority of the packet filter rule.

(5) Filter Rule Object Information, which is Optional

The filter rule object information may be a context property "FilterRuleNetwork" of the H.248 protocol. This context property is designed to identify the network domain and/or interface to which the filter rule is applicable. For example, this context property describes the network domain and/or interface (logical interface or physical interface) to which the packet filter rule is applicable.

Taking the foregoing contents included in the context as an example, the process in FIG. 2 is as follows:

(1) Process of Creating a New Packet Filter Rule Context

Step 1: The MGC sends an H.248 message for creating a packet filter rule context to the MG. The creation of the packet filter rule context is to add one or more terminations to a context which uses a wildcard as a context ID. The MG returns a reply message that carries the context ID allocated by the MG. In this message, the value of the context property "FilterRule" is "Yes", indicating that the context is a packet filter rule context. If the value of the context property "FilterRuleItem" is "reIn: 138.76.28.0/24", it indicates rejection of the packet from the network segment with the network address "138.76.28.0" and mask "255.255.255.0"; If the value of the context property "FilterRuleSwitch" is "yes", it indicates that the packet filter rule is valid. If the value of the context property "FilterRulePrior" is 100, it indicates that the priority is 100. If the value of the context property "FilterRuleNetwork" is "interface1", it indicates that the packet filter rule is applied to interface1.

Step 2: After receiving the H.248 message for creating a packet filter rule context, the MG creates a new context C1 as indicated by the H.248 message, and returns a reply message to the MGC. According to the context property "FilterRuleItem" of this context, the MG adds the packet filter rule onto interface1 to filter the packet transmitted on interface1.

(2) Process of Modifying a Context

Step 1: The MGC sends a message for modifying a packet filter rule context to the MG, in an attempt to modify the value of the property "FilterRuleItem" of the context C1 from "reIn: 138.76.28.0/24" to "acIn: 138.76.28.0/24". After the modification, the rule indicates acceptance of the packet from the network segment with the network address "138.76.28.0" and mask "255.255.255.0".

Step 2: The MG modifies the property of the context C1 according to the received message, and returns a reply message to the MGC. Moreover, the MG modifies the relevant packet filter rule currently applied on interface1 to filter the packet transmitted on Interface1.

(3) Process of Deleting a Context or a Filter Rule in the Context

Step 1: The MGC sends a message for deleting a packet filter rule context to the MG, in an attempt to delete all terminations in the context C1.

Step 2. The MG deletes context C1 or all filter rules in C1 according to the instruction, and returns a reply message to the MGC, and deletes the packet filter rule "acin: 138.76.28.0/24" on interface1.

In the embodiment above, the packet filter rule, packet filter rule switch, priority, and filter rule object information are maintained through a context property. Such information may also be maintained by maintaining the property of the termination in the context. In this case, the termination property includes:

(1) A Filter Rule Property, which is Mandatory

The filter rule may be the property "FilterRuleItemT" of the H.248 protocol, and this context property is carried in the "localcontrol" descriptor of the termination. The data type of this context property and the information stored in it are the same as those of the context property "FilterRuleItem" in the previous embodiment.

(2) A Packet Filter Rule Switch Property, which is Optional

The packet filter rule switch property may be the property "FilterRuleSwitchT" of the H.248 protocol, and this property is carried in the "localcontrol" descriptor of the termination. The data type of this packet filter rule switch property and the information stored in it are the same as those of the context property "FilterRuleSwitch" in the previous embodiment.

(3) A Priority Property, which is Optional

The priority property may be the property "FilterRulePriorT" of the H.248 protocol, and this priority property is carried in the "localcontrol" descriptor of the termination. The data type of the priority property and the information stored in it are the same as those of the context property "FilterRuleP-rior" in the previous embodiment.

(4) Filter Rule Object Information, which is Optional

The filter rule object information may be the context property "FilterRuleNetworkT" of the H.248 protocol, and this property is carried in the "localcontrol" descriptor of the termination. The data type of this context property and the information stored in it are the same as those of the context property "FilterRuleNetwork" in the previous embodiment.

Such termination property is set onto the termination in the packet filter rule context. The operations for such terminations may be understood as adding, modifying, and deleting the packet filter rule context.

The foregoing filter rules and the added optional properties may be implemented partially through a context property, and partially through a termination property.

In the technical solution provided herein, the MGC controls the packet filter rules on the interface of the MG by processing the packet filter rule contexts in the MG. Because there may be multiple packet filter rule contexts, the MGC can set all filter rules on the interfaces of multiple MGs in separate attempts, and can set the contexts in multiple attempts through messages transmitted between the MGC and the MG, thereby managing the packet filter rules on the interface of the MG effectively.

FIG. 3 shows a structure of a network system in an embodiment of the present disclosure. As shown in FIG. 3, the network system includes an MG 1 an MGC 2. The MGC 2 is configured to send a processing message to the MG 1; and the MG 1 is configured to maintain a packet filter rule context according to the processing message sent by the MGC 2, and filter the packet received or sent by the MG according to the filter rules in the packet filter rule context, where the packet filter rule context includes at least one filter rule for filtering the packet received or sent by the MG.

The MG 1 includes:

a context processing unit 12, configured to maintain the packet filter rule context according to the processing message sent by the MGC, where the packet filter rule context includes at least one filter rule for filtering a packet received or sent by the MG; and a filtering unit 14, configured to filter the packet received or sent by the MG according to the filter rules in the packet filter rule context.

The context processing unit 12 includes a creating module 120, a modifying module 122, or a deleting module 124, or any combination thereof.

Figure 4:
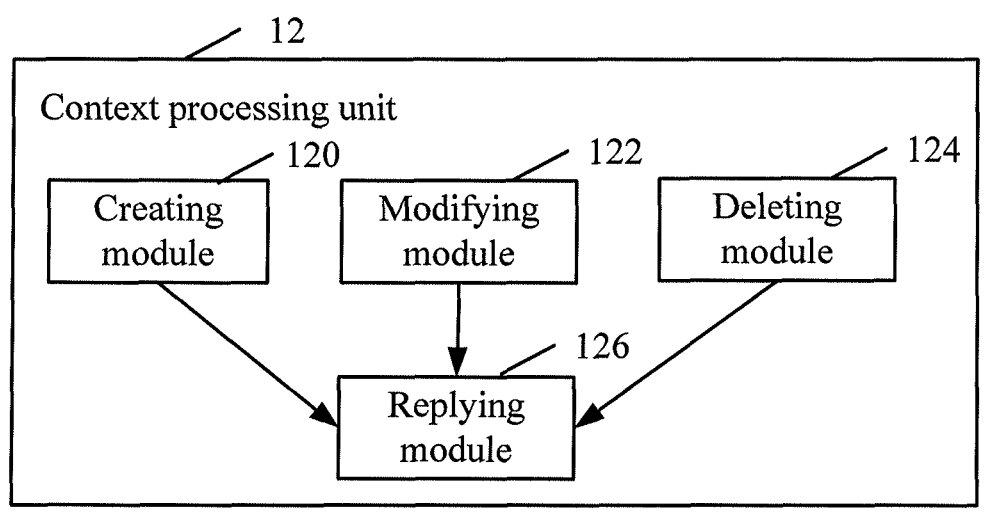
FIG. 4 shows a structure of a context processing unit in a network system in an embodiment of the present invention.

The creating module 120 is configured to create a new packet filter rule context according to a creation message sent by the MGC; the modifying module 122 is configured to modify the created packet filter rule context according to the modification message sent by the MGC, where the modification of the created packet filter rule context includes adding, modifying or deleting the filter rules in the packet filter rule context; and the deleting module 124 is configured to delete the created packet filter rule context according to a deletion message sent by the MGC. FIG. 4 shows a structure of a context processing unit in a network system in an embodiment of the present disclosure. In FIG. 4, the context processing unit 12 includes all the three modules.

Meanwhile, the context processing unit 12 further includes a replying module 126, which is configured to return a reply message to the MGC after the creating module 120 completes creation, or the modifying module 122 completes modification, or the deleting module 124 completes deletion.

Figure 5:
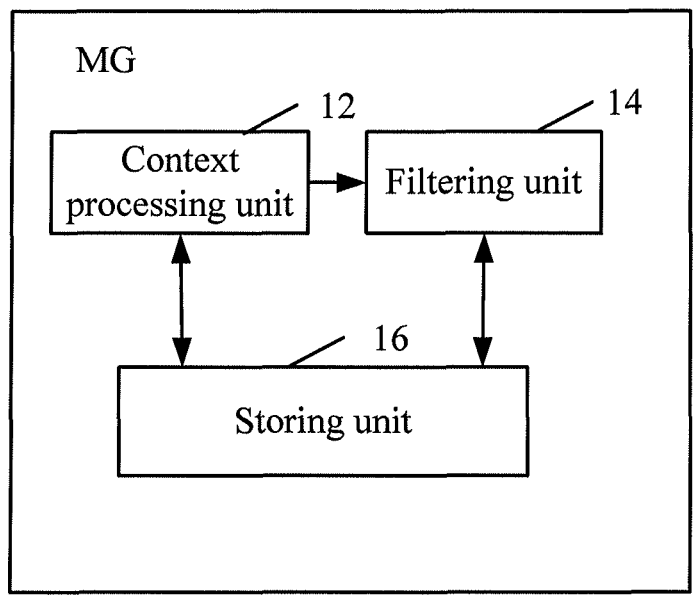
FIG. 5 is a first schematic diagram of a structure of an MG in an embodiment of the present invention.

FIG. 5 is the first schematic diagram of a structure of an MG in an embodiment of the present disclosure. As shown in FIG. 5, the MG may further include a storing unit 16, which is configured to store the packet filter rule context. The storing unit 16 includes a rule module, which is configured to store the filter rules. Further, the storing unit 16 may include one or more of the following modules: a flag property module, configured to store the flag property which identifies the context as the packet filter rule context; a packet filter rule switch property module, configured to store the switch property that indicates whether the filter rules in the packet filter rule context are valid; a priority property module, configured to store the priority property that indicates the priority of the filter rules in the packet filter rule context; and an object module, configured to store filter rule object information that indicates the network domain and/or interface to which the filter rule is applicable. In FIG. 5, the storing unit includes all the five modules.

Figure 6:
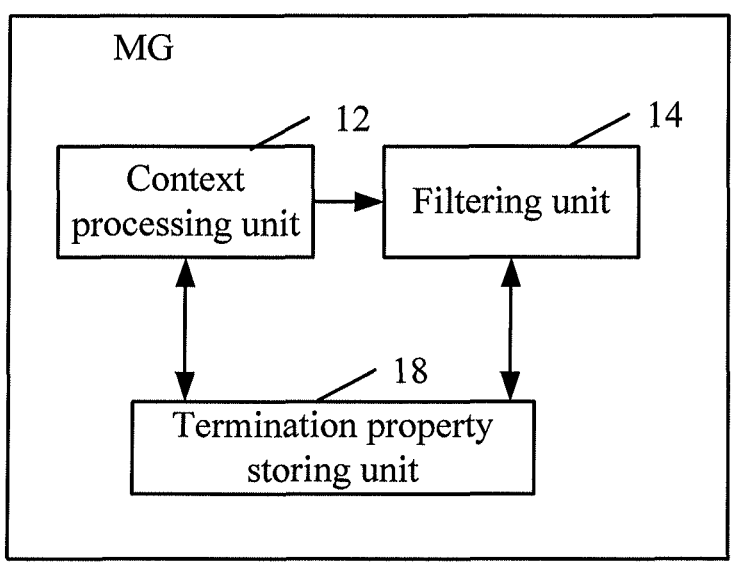
FIG. 6 is a second schematic diagram of a structure of an MG in an embodiment of the present invention.

FIG. 6 is the second schematic diagram of a structure of an MG in an embodiment of the present disclosure. As shown in FIG. 6, the MG may include a termination property storing unit 18, which is configured to store a property of the termination in the packet filter rule context. The termination property storing unit 18 includes a termination rule storing module, which is configured to store filter rules in a termination property. Further, the termination property storing unit 18 includes one or more of the following modules: a termination object module, configured to store filter rule object information into the termination property, where the filter rule object information indicates the network domain and/or interface to which the filter rule is applicable; a termination flag property module, configured to store the flag property into the termination property, where the flag property identifies the context as the packet filter rule context; a termination packet filter rule switch property module, configured to store the switch property into the termination property, where the switch property indicates whether the filter rules in the packet filter rule context are valid; and a termination priority property module, configured to store the priority property into the termination property, where the priority property indicates the priority of the filter rules in the packet filter rule context.

The MG may include both the storing unit 16 and the termination property storing unit 18, or include either of them, as long as the storing unit 16 and/or the termination property storing unit 18 stores the filter rules and/or the corresponding properties. That is, all submodules in the storing unit 16 and the termination property storing unit 18 may exist alternately (namely, the corresponding filter rules and the added optional properties may be implemented partially through the context property and partially through the termination property).

In the technical solution provided herein, the MGC controls the packet filter rules on the interface of the MG by processing the packet filter rule contexts in the MG. Because there may be multiple packet filter rule contexts, the MGC may set all filter rules on the interfaces of multiple MGs in separate attempts, and set the contexts through messages transmitted between the MGC and the MG in multiple attempts, thereby managing the packet filter rules on the interface of the MG effectively.

The apparatus embodiment above is illustrative in nature. The units described as stand-alone components above may be separated physically or not; and the components illustrated as units may be physical units or not, namely, they may be located in one place, or distributed on multiple network elements. Some or all of the modules described above may be selected as required to fulfill the objectives of the technical solution under the present disclosure, which can be understood and implemented by those skilled in the art without creative efforts.

After reading the foregoing embodiments, persons skilled in the art are clearly aware that the embodiments of the present disclosure may be implemented through hardware, or through software in addition to a necessary universal hardware platform. Therefore, the technical solution under the present disclosure or its novelty in contrast to the prior art may be embodied in a software product. The software product may be stored in a computer-readable storage medium such as a Read Only Memory/Random Access Memory (ROM/RAM), a magnetic disk and a CD-ROM, and incorporate several instructions for instructing a computer device (for example, a personal computer, a server, or a network device) to execute the method specified in each embodiment of the present disclosure or part of the embodiment.

The embodiments described above shall not be constructed as limitations to the scope of the present disclosure. Any modification, equivalent replacement, or improvement made without departing from the spirit and principles of the present disclosure shall fall within the scope of the present disclosure.

What is claimed is:

1. A method for managing a filter rule, comprising:
   receiving, by a Media Gateway (MG), a processing message sent by a Media Gateway Controller (MGC); and
   maintaining, by the MG, a packet filter rule context according to the processing message, wherein the packet filter rule context comprises a filter rule for filtering a packet received or sent by the MG, and the processing message comprises a message for creating, modifying or deleting the packet filter rule context
   wherein the packet filter rule context further comprises at least one of the following context properties: a filter rule object, indicating a network domain or an interface to which the filter rule is applied; a flag property, indicating that the context is a packet filter rule context; a packet filter rule switch property, indicating whether the filter rule in the packet filter rule context are valid; and a priority property, indicating a priority of the filter rule in the packet filter rule context.

2. The method according to claim 1, wherein the maintaining, by the MG, the packet filter rule context according to the processing message comprises one of:
   creating a new packet filter rule context according to a message for creating the packet filter rule context sent by the MGC, or modifying a created packet filter rule context according to a message for modifying the packet filter rule context sent by the MGC, or deleting a created packet filter rule context according to a message for deleting the packet filter rule context sent by the MGC; and
   returning a reply message to the MGC after completion of the creation, modification or deletion.

3. The method according to claim 2, wherein the modifying the created packet filter rule context according to the message for modifying the packet filter rule context sent by the MGC comprises one of:
   adding, modifying or deleting a filter rule carried in the packet filter rule context according to the message for modifying the packet filter rule context sent by the MGC.

4. The method according to claim 1, wherein:
   the packet filter rule context comprises a termination, and a termination property of the termination comprise the filter rule.

5. The method according to claim 2, wherein:
   the packet filter rule context comprises a termination, and a termination property of the termination comprise the filter rule.

6. The method according to claim 3, wherein:
   the packet filter rule context comprises a termination, and a termination property of the termination comprise the filter rule.

7. A method for managing a filter rule, comprising: receiving, by a Media Gateway (MG), a processing message sent by a Media Gateway Controller (MGC); and
   maintaining, by the MG, a packet filter rule context according to the processing message, wherein the packet filter rule context comprises a filter rule for filtering a packet received or sent by the MG, and the processing message comprises a message for creating, modifying or deleting the packet filter rule context,
   wherein: the packet filter rule context further comprises a termination, and a termination property of the termination comprises one or more of the following properties:
   a filter rule object, indicating a network domain and/or an interface to which the filter rule is applied;
   a flag property, indicating that the context is a packet filter rule context;
   a packet filter rule switch property, indicating whether the filter rule in the packet filter rule context are valid; and
   a priority property, indicating a priority of the filter rule in the packet filter rule context.

8. A Media Gateway (MG), comprising:
   a context processing unit, configured to maintain a packet filter rule context according to a processing message sent by a Media Gateway Controller (MGC), wherein the packet filter rule context comprises a filter rule for filtering a packet received or sent by the MG, and the processing message may be a message for creating, modifying or deleting the packet filter rule context;

wherein the packet filter rule context further comprises at least one of the following context properties: a filter rule object, indicating a network domain; an interface to which the filter rule is applied; a flag property, indicating that the context is a packet filter rule context; a packet filter rule switch property, indicating whether the filter rule in the packet filter rule context are valid; and a priority property, indicating a priority of the filter rule in the packet filter rule context; and a filtering unit, configured to filter the packet received or sent by the MG according to the filter rule in the packet filter rule context.

9. The MG according to claim 8, wherein:

the context processing unit comprises one or more of the following modules:

a creating module, configured to create a new packet filter rule context according to a message for creating the packet filter rule context sent by the MGC;

a modifying module, configured to modify a created packet filter rule context according to a message for modifying the created packet filter rule context sent by the MGC, wherein the modification of the created packet filter rule context comprises adding, modifying or deleting the filter rule in the packet filter rule context; and a deleting module, configured to delete a created packet filter rule context according to a message for deleting the created packet filter rule context sent by the MGC;

and the context processing unit further comprises:

a replying module, configured to return a reply message to the MGC after the creating module completes creation by the creating module, or the modifying module completes modification, or the deleting module completes deletion.

10. The MG according to claim 9, wherein:

the MG comprises a storing unit, and the storing unit comprises a rule module which is configured to store the filter rule.

11. The MG according to claim 10, wherein:

the storing unit further comprises one or more of the following modules:

an object module, configured to store filter rule object information that indicates a network domain and/or an interface to which the filter rule is applicable;

a flag property module, configured to store a flag property which identifies the context as the packet filter rule context;

a packet filter rule switch property module, configured to store a switch property that indicates whether the filter rule in the packet filter rule context are valid; and a priority property module, configured to store a priority property that indicates a priority of the filter rule in the packet filter rule context.

12. The MG according to claim 9, wherein:

the MG comprises a termination property storing unit, which is configured to store a termination property of termination in the packet filter rule context; and the termination property storing unit comprises a termination rule storing module, which is configured to store the filter rule in the termination property.

13. The MG according to claim 11, wherein the termination property storing unit further comprises one or more of the following modules:

a termination object module, configured to store filter rule object information into the termination property, wherein the filter rule object information indicates a network domain and/or an interface to which the filter rule is applicable;

a termination flag property module, configured to store a flag property into the termination property, wherein the flag property identifies the context as the packet filter rule context;

a termination packet filter rule switch property module, configured to store a switch property into the termination property, wherein the switch property indicates whether the filter rule in the packet filter rule context are valid; and a termination priority property module, configured to store a priority property into the termination property, wherein the priority property indicates a priority of the filter rule in the packet filter rule context.

14. The MG according to claim 12, wherein the termination property storing unit further comprises one or more of the following modules:

a termination object module, configured to store filter rule object information into the termination property, wherein the filter rule object information indicates a network domain and/or an interface to which the filter rule is applicable;

a termination flag property module, configured to store a flag property into the termination property, wherein the flag property identifies the context as the packet filter rule context;

a termination packet filter rule switch property module, configured to store a switch property into the termination property, wherein the switch property indicates whether the filter rule in the packet filter rule context are valid; and a termination priority property module, configured to store a priority property into the termination property, wherein the priority property indicates a priority of the filter rule in the packet filter rule context.

15. A network system, comprising:

a Media Gateway Controller (MGC), configured to send a processing message to a Media Gateway (MG); and the MG, configured to maintain a packet filter rule context according to the processing message sent by the MGC, and filter a packet received or sent by the MG according to filter rule in the packet filter rule context, wherein the packet filter rule context comprises a filter rule for filtering the packet received or sent by the MG, and the processing message may be a message for creating, modifying or deleting the packet filter rule context;

wherein the packet filter rule context further comprises at least on one of the following context properties: a filter rule object, indicating a network domain; an interface to which the filter rule is applied; a flag property, indicating that the context is a packet filter rule context; a packet filter rule switch property, indicating whether the filter rule in the packet filter rule context are valid;

and a priority property, indicating a priority of the filter rule in the packet filter rule context.

* * * * *